(12) United States Patent
Koishi

(10) Patent No.: US 8,531,548 B2
(45) Date of Patent: Sep. 10, 2013

(54) IMAGE PROCESSING METHOD, IMAGE PROCESSING PROGRAM, IMAGE PROCESSING DEVICE AND CAMERA

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 216 days.

(21) Appl. No.: 12/312,603

(22) PCT Filed: Nov. 22, 2007

(86) PCT No.: PCT/JP2007/072676
§ 371 (c)(1),
(2), (4) Date: May 19, 2009

(87) PCT Pub. No.: WO2008/062874
PCT Pub. Date: May 29, 2008

(65) Prior Publication Data
US 2010/0026837 A1    Feb. 4, 2010

(30) Foreign Application Priority Data
Nov. 22, 2006    (JP) .................. 2006-315909

(51) Int. Cl.
*H04N 5/225*    (2006.01)
*H04N 9/73*    (2006.01)
*G06K 9/00*    (2006.01)

(52) U.S. Cl.
USPC ............... 348/223.1; 348/207.1; 382/167

(58) Field of Classification Search
USPC ......... 348/222.1, 223.1, 224.1, 225.1, 207.1; 382/162, 167
See application file for complete search history.

(56) References Cited

U.S. PATENT DOCUMENTS

| | | | |
|---|---|---|---|
| 5,920,358 A | 7/1999 | Takemura | |
| 6,259,473 B1 | 7/2001 | Iko et al. | |
| 6,373,531 B1 | 4/2002 | Hidaka et al. | |
| 6,560,358 B1 | 5/2003 | Tsukada | |
| 6,856,354 B1 * | 2/2005 | Ohsawa | 348/370 |
| 6,987,519 B2 * | 1/2006 | Kumada et al. | 345/603 |
| 7,120,295 B2 | 10/2006 | Edge et al. | |
| 7,436,995 B2 * | 10/2008 | Ito et al. | 382/162 |
| 7,605,823 B2 | 10/2009 | Stokes et al. | |
| 7,830,566 B2 * | 11/2010 | Yamada et al. | 358/518 |

(Continued)

FOREIGN PATENT DOCUMENTS

| | | |
|---|---|---|
| EP | 0 767 445 A2 | 4/1997 |
| JP | A-7-222196 | 8/1995 |

(Continued)

OTHER PUBLICATIONS

U.S. Appl. No. 12/385,398, filed Apr. 7, 2009 in the name of Erika Koishi.

(Continued)

*Primary Examiner* — Daniel M Pasiewicz
(74) *Attorney, Agent, or Firm* — Oliff & Berridge, PLC

(57) ABSTRACT

An image processing method for executing color conversion processing on input image data by taking into consideration chromatic adaptation so as to match a color appearance perceived under a first viewing condition and a color appearance perceived under a second viewing condition, includes: executing the color conversion processing by setting in correspondence to each of parameters representing colors, at least one of an adaptation factor indicating an extent of adaptation to the first viewing condition and an adaptation factor indicating an extent of adaptation to the second viewing condition.

19 Claims, 12 Drawing Sheets

(56) References Cited

U.S. PATENT DOCUMENTS

Figure 1:
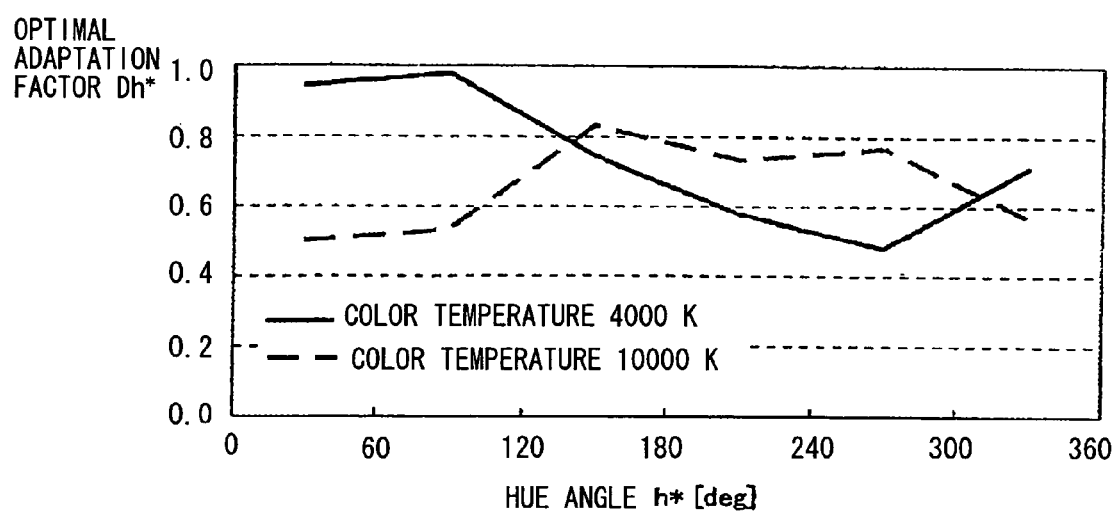

| | | | |
|---|---|---|---|
| 8,013,903 B2* | 9/2011 | Ohga | 348/222.1 |
| 8,026,953 B2 | 9/2011 | Lammers et al. | |
| 2001/0011966 A1* | 8/2001 | Iwane et al. | 345/4 |
| 2002/0118210 A1* | 8/2002 | Yuasa et al. | 345/589 |
| 2004/0042653 A1* | 3/2004 | Hu | 382/167 |
| 2004/0201727 A1* | 10/2004 | Ichikawa et al. | 348/223.1 |
| 2005/0220340 A1 | 10/2005 | Nakabayashi et al. | |
| 2007/0058186 A1* | 3/2007 | Tanaka | 358/1.9 |
| 2011/0013833 A1 | 1/2011 | Hoof et al. | |

FOREIGN PATENT DOCUMENTS

| | | |
|---|---|---|
| JP | A-8-46989 | 2/1996 |
| JP | A-9-93451 | 4/1997 |
| JP | A-9-102882 | 4/1997 |
| JP | A-9-219800 | 8/1997 |
| JP | A-11-55688 | 2/1999 |
| JP | A-2000-050086 | 2/2000 |
| JP | A-2000-113174 | 4/2000 |
| JP | A-2000-175062 | 6/2000 |
| JP | A-2001-143065 | 5/2001 |
| JP | A-2003-018416 | 1/2003 |
| JP | A-2003-18420 | 1/2003 |
| JP | B2-3634633 | 3/2005 |
| JP | B2-3635673 | 4/2005 |
| WO | WO 2008/050761 A1 | 5/2008 |

OTHER PUBLICATIONS

Kanematsu et al; "Hue Dependency of Adaptation Factor D in CIECAM02;" http://www.ren-associates.com/ColorForumJ/program/home_jp.html; Oct. 16, 2006; p. 3; Lines 17-18.

Katoh; "Practical Method for Appearance Match Between Soft Copy and Hard Copy;" *Proceedings of the International Society for Optical Engineering (SPIE)*; Feb. 7, 1994; pp. 170-181; vol. 2170.

Extended European Search Report dated Jul. 21, 2010 in corresponding European Application No. 07 829 580.5.

"Dependency of D-factor, the degree of adaptation factor, on hue," published by Erika Kanematsu and Hideyasu Kuniba at the meeting of Color Forum Japan 2006 held from Nov. 27-29, 2006.

Office Action issued in corresponding European Application No. 07 829 580.5 dated Mar. 10, 2011.

Nov. 8, 2011 Japanese Office Action issued in Japanese Patent Application No. 2008-538752 (with translation).

Dec. 7, 2011 Office Action issued in U.S. Appl. No. 12/385,398.

Jul. 19, 2012 Office Action issued in U.S. Appl. No. 12/385,398.

Sep. 7, 2011 Office Action issued in U.S. Appl. No. 12/385,398.

"A Colour Appearance Model for Colour Management Systems: CIECAM02," International Commission on Illumination, pp. 6-7, from 2004.

* cited by examiner

IMAGE PROCESSING METHOD, IMAGE PROCESSING PROGRAM, IMAGE PROCESSING DEVICE AND CAMERA

TECHNICAL FIELD

The present invention relates to an image processing method, an image processing program, an image processing device and a camera, which may be adopted to execute color conversion by taking into consideration the difference between viewing conditions.

BACKGROUND ART

Color takes on different appearances under different viewing conditions in such as the illumination white point, the illumination brightness, the ambient light level and the like. While the von Kries chromatic adaptation model in the known art is often adopted when executing a chromatic adaptation transform by taking into consideration the difference between the white points, the CIECAM02 may be adopted as a color appearance model if further details in the difference between the viewing conditions, including the difference in the luminance and the difference in the ambient light level, must be factored in. Since visual perception is not always completely adapted to the illumination condition provided in a given viewing condition, a chromatic adaptation transform that takes into consideration adaptation factors D ($0.0 \leq D \leq 1.0$) each indicating the rate of adaptation to a given viewing condition, the light source used under which a white point different from that of the light source used under a different viewing condition, is executed.

The adaptation factor D is determined in conformance to a specific viewing condition. For instance, in the color appearance model defined in the CIE, such as the CIECAM 97s or the CIECAM02, a value calculated based upon an adapted luminance $L_A$ (normally calculated as $L_A = L_{dw}/5$ in relation to the illumination brightness level $L_{dw}$) and a parameter F determined in correspondence to the ambient light level (whether or not the environment is bright or dark) is used (patent reference 1).

[Expression 1]

$$D = F \cdot \left[1 - \left(\frac{1}{3.6}\right)e^{\left(\frac{-(L_A+42)}{92}\right)}\right] \quad (1)$$

$$L_A = L_{dw}/5 \quad (2)$$

In addition, patent reference 2 proposes a method whereby the adaptation factor is adjusted based upon the relative color temperature of the illumination.
Patent reference 1: Japanese Patent Publication No. 3634633.
Patent reference 2: Japanese Laid Open Patent Publication No. H11-055688

DISCLOSURE OF THE INVENTION

Problems to be Solved by the Invention

In the color appearance model in the related art described above, the value of each adaptation factor D is determined in correspondence to a specific viewing condition and the adaptation factor thus determined is invariably used regardless of parameters indicating the three primary colors, which may be the three primary colors L, M and S in a cones color space, representing the physiological primary colors of human visual perception and determined based upon the cone spectral sensitivity distribution, or the three primary colors R, G and B determined based upon the spectral sensitivity characteristics for the R, G and B colors assumed at the sensor used to obtain images.

However, there may arise a situation in which the color appearance of an input image and the color appearance of an output image do not match, depending upon the illumination condition under which the input image acquisition scene is lit or the viewing condition under which the input image is observed and the viewing condition under which the output image is observed.

Means for Solving the Problems

According to the 1st aspect of the present invention, an image processing method for executing color conversion processing on input image data by taking into consideration chromatic adaptation so as to match a color appearance perceived under a first viewing condition and a color appearance perceived under a second viewing condition, comprises: executing the color conversion processing by setting in correspondence to each of parameters representing colors, at least one of an adaptation factor indicating an extent of adaptation to the first viewing condition and an adaptation factor indicating an extent of adaptation to the second viewing condition.

According to the 2nd aspect of the present invention, in the image processing method according to the 1st aspect, it is preferred that: the first viewing condition is a scene illumination condition under which a scene where an input image is obtained is illuminated or a viewing condition under which the input image is observed; and the second viewing condition is a viewing condition under which an output image is observed.

According to the 3rd aspect of the present invention, in the image processing method according to the 2nd aspect, it is preferred that the adaptation factor is adjusted in correspondence to the scene illumination condition or the viewing condition under which the input image is observed.

According to the 4th aspect of the present invention, in the image processing method according to the 2nd or the 3rd aspect, it is preferred that the adaptation factor is adjusted in correspondence to the viewing condition under which the output image is observed.

According to the 5th aspect of the present invention, in the image processing method according to any one of the 2nd through 4th aspects, it is preferred that pixel values in the input image are analyzed and the adaptation factor is adjusted based upon a pixel value distribution ascertained through analysis.

According to the 6th aspect of the present invention, in the image processing method according to the 5th aspect, it is preferred that the input image is divided into a plurality of areas and the adaptation factor is adjusted in correspondence to each area.

According to the 7th aspect of the present invention, in the image processing method according to any one of the 1st through 6th aspects, it is preferred that the parameters representing colors are made up with values assumed for three primary colors.

According to the 8th aspect of the present invention, in the image processing method according to the 7th aspect, it is preferred that the three primary colors are either physiological primary colors LMS determined based upon cone spectral sensitivity or sensor RGB.

According to the 9th aspect of the present invention, in the image processing method according to the 7th or the 8th aspect, it is preferred that the adaptation factor is adjusted either based upon response values each representing a response to white in correspondence to one of the three primary colors and a luminance level of illumination illuminating the scene where the input image is obtained or a luminance level under the viewing condition in which the input image is observed, or based upon the response values and a luminance level under the viewing condition in which the output image is observed.

According to the 10th aspect of the present invention, in the image processing method according to any one of the 1st through 9th aspects, it is preferred that the adaptation factor set in correspondence to each of the parameters representing colors assumes a greater value when a greater amount of light is sensed while observing white.

According to the 11th aspect of the present invention, in the image processing method according to the 10th aspect, it is preferred that the amount of light is indicated as a response value representing a response to white in correspondence to each of the three primary colors.

According to the 12th aspect of the present invention, an image processing program enables a computer to execute an image processing method according to anyone of the 1st through 11th aspects.

According to the 13th aspect of the present invention, an image processing device has installed therein an image processing program according to the 12th aspect.

According to the 14th aspect of the present invention, camera comprises: an imaging unit that captures a subject image; a display unit; and a control unit, and the control unit executes color conversion processing on image data generated by capturing an image via the imaging unit through an image processing method according to anyone of the 1 through 11 and displays image data resulting from the color conversion processing at the display unit.

According to the 15th aspect of the present invention, in the camera according to the 14th aspect, it is preferred that: the camera further comprises a photometering unit; and the control unit sets the viewing condition under which the output image is observed based upon photometering data obtained via the photometering unit and an illumination condition under which the image display unit is illuminated.

Advantageous Effect of the Invention

According to the present invention, the appearance of color as perceived under a given viewing condition or illumination condition can easily be reproduced with a high degree of accuracy under another viewing condition or illumination condition.

Figure 2:
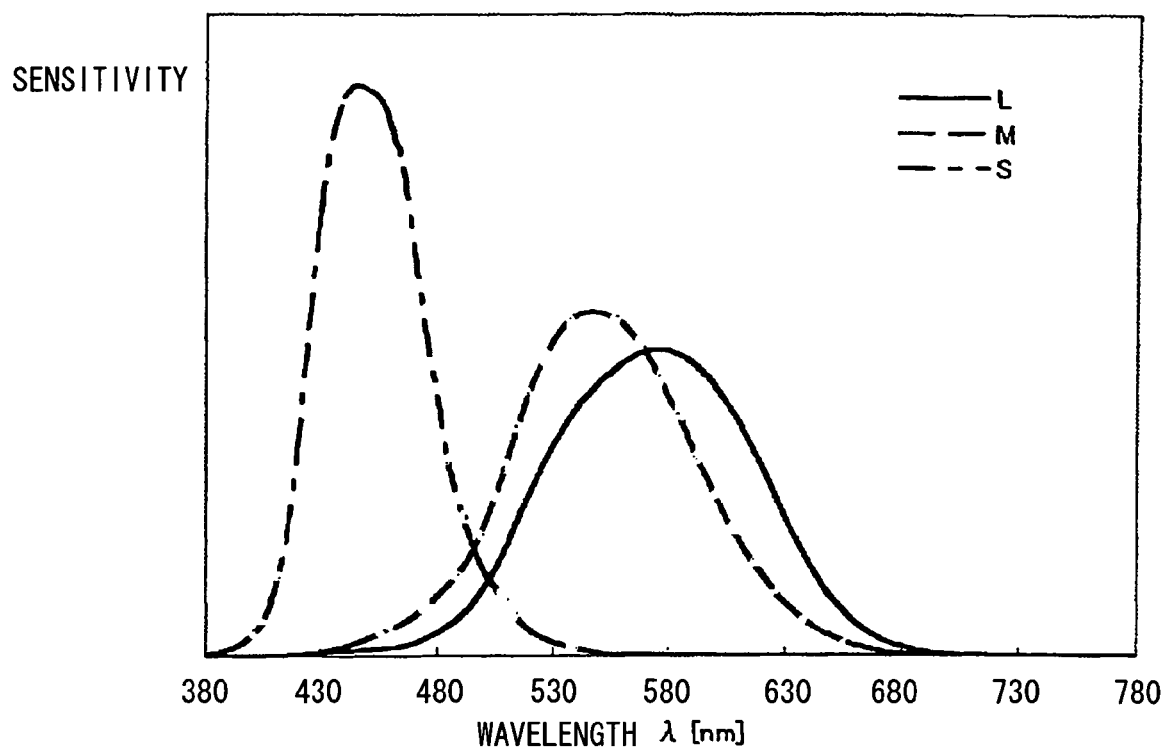
Figure 3:
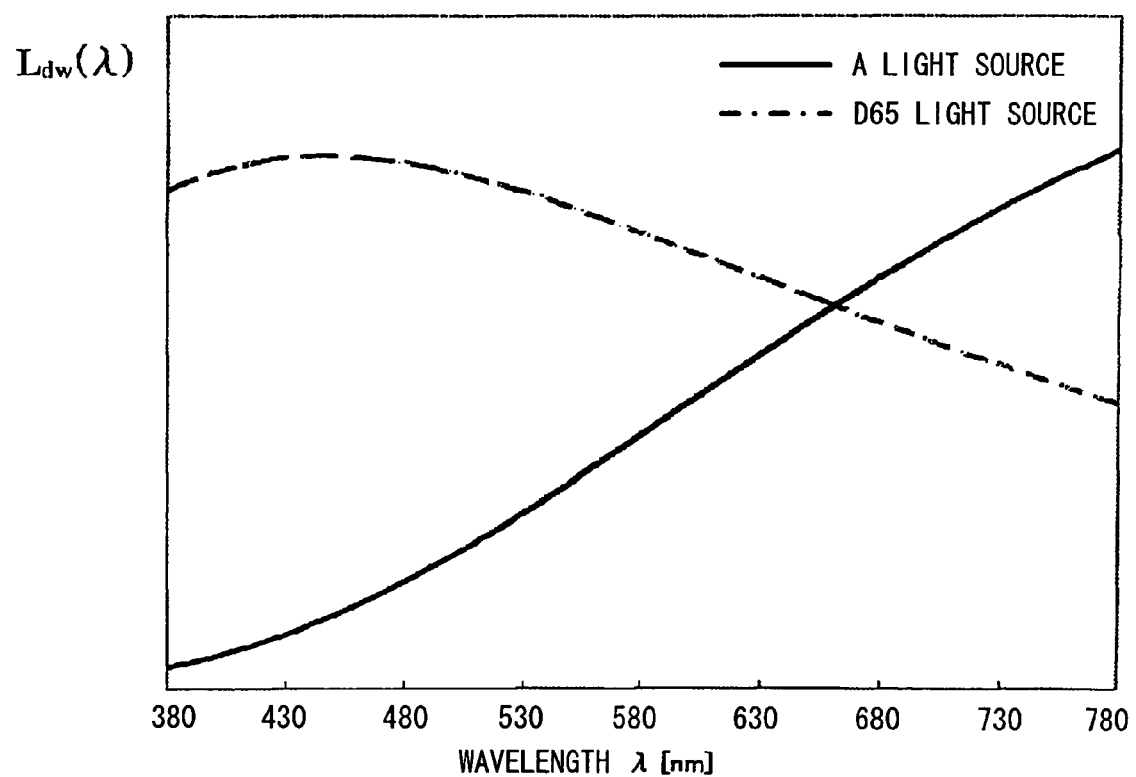

BRIEF DESCRIPTION OF THE DRAWINGS (FIG. 1) A correlation diagram indicating the optimal adaptation factors each corresponding to a specific light source, as determined by the inventor of the present invention (FIG. 2) A characteristics diagram of the LMS cone spectral sensitivity characteristics (FIG. 3) Spectrums of light emitted at a D65 light source and an A light source (FIG. 4) A spectral diagram of light as sensed by human visual cone cells under the D65 light source (FIG. 5) A spectral diagram of light as sensed by human visual cone cells under the A light source (FIG. 6) A structure that may be adopted in the image processing device in each of the embodiments of the present invention (FIG. 7) A flowchart of the processing executed by the personal computer 1 in a first embodiment of the present invention (FIG. 8) A circuit diagram illustrating the circuit structure adopted in the digital camera in a second embodiment of the present invention (FIG. 9) A flowchart of the processing executed by the control unit 31 in the second embodiment of the present invention (FIG. 10) A flowchart of the processing executed by the control unit 31 in a third embodiment of the present invention (FIG. 11) A flowchart of the processing executed by the personal computer 1 in a fifth embodiment of the present invention (FIG. 12) A flowchart of the processing executed by the personal computer 1 in a sixth embodiment of the present invention

BEST MODE FOR CARRYING OUT THE INVENTION

In order to find out the problems described earlier, the inventor of the present invention conducted color appearance tests.

The color appearance tests conducted by the inventor are first described. In each color appearance test, a highly qualified specialist in the appearance of color is asked to select colors of similar appearance in two viewing conditions having different color temperatures. Through such color appearance tests in which the specialist selects from a plurality of colors resulting from color conversion executed by altering the adaptation factor D and perceived in second viewing condition with a given color temperature, a color that is the closest in appearance to a color perceived under first viewing condition with a different color temperature, results indicating how the optimal adaptation factor D, dependent upon the hue, changes, are obtained.

A reference color A(h*) is displayed under a viewing condition with a color temperature $T_1$. The reference color A(h*) is represented by the hue h*. It is to be noted that the hue h* is indicated as a hue angle. The results obtained through CIACAM02 color conversion executed on the reference color A(h*) by taking into consideration the difference between the color temperatures $T_1$ and $T_2$ are displayed under the viewing condition with the color temperature $T_2$. The color conversion is executed by using the adaptation factor D taking on different values within a range of D=0.0~1.0 instead of a single adaptation factor value that may be estimated based upon viewing conditions such as the illumination brightness and the ambient light level, and the plurality of resulting colors B(h*, D) are displayed as color options. The specialist compares the appearance of the color A(h*) observed under the viewing condition with the color temperature $T_1$ with the appearances of the colors B(h*, D) (D=0.0 . . . , 1.0) observed under the viewing condition with the color temperature $T_2$ and selects a color B(h*, D) closest in appearance to A(h*). This test procedure is executed for a plurality of colors assuming various hue angles h* without changing the brightness or the saturation level of the reference color A(h*).

A plurality of participants took part in the test described above a plurality of times and the results presented in FIG. 1 were obtained by collecting the individual test results. In FIG. 1, showing the relationship between the optimal adaptation factor $D_h$* and the hue angle h*, the hue angle h* (in units of deg) is indicated along the horizontal axis and the participant average value of the optimal adaptation factors $D_h{}^*$ corresponding to the colors selected as the closest in appearance in the individual tests is indicated along the vertical axis. Tests were conducted in relation to the embodiment for six colors with different hue angles; $h^*=30°$ (red), $h^*=90°$ (yellow), $h^*=150°$ (green), $h^*=210°$ (cyan), $h^*=270°$ (blue) and $h^*=330°$ (magenta). The results presented in FIG. 1 indicate that the optimal adaptation factor changes in conformance to the hue and that the color appearance is better approximated by increasing $D_h{}^*$ when $h^*=90°$ (yellow) and reducing $D_h{}^*$ when $h^*=270°$ (blue).

FIG. 1 shows the optimal relationships between the adaptation factor $D_h{}^*(h^*)$ and the hue angle $h^*$, as observed when a light source assuming a color temperature of 4000K is used and when a light source assuming a color temperature of 10,000K is used. These optimal relationships were ascertained by adopting a test method similar to that described earlier in "color appearance test results" in conjunction with different illuminating light sources. As FIG. 1 indicates, the adaptation factor $D_h{}^*(h^*)$ assumes different values in correspondence to different light sources.

The inventor of the present invention surmises that such changes in the adaptation factor are attributable to the variance among the amounts of light sensed by the three cone cells L, M and S. The quantities of light $L_W$, $M_W$, $S_W$ sensed by the L, M and S cones while observing white under a given light source are represented respectively by the product of the cone spectral sensitivity $L(\lambda)$ in FIG. 2 and the light source spectral characteristics $L_{dw}(\lambda)$ in FIG. 3, the product of the: spectral sensitivity $M(\lambda)$ in FIG. 2 and the light source spectral characteristics $L_{dw}(\lambda)$ and the cone spectral sensitivity $S(\lambda)$ in FIG. 2 and the light source spectral characteristics $L_{dw}(\lambda)$.

[Expression 2]

$$L_W = \int L(\lambda) \cdot L_{dw}(\lambda) \cdot d\lambda \qquad (3)$$

$$M_W = \int M(\lambda) \cdot L_{dw}(\lambda) \cdot d\lambda \qquad (4)$$

$$S_W = \int S(\lambda) \cdot L_{dw}(\lambda) \cdot d\lambda \qquad (5)$$

Figure 4:
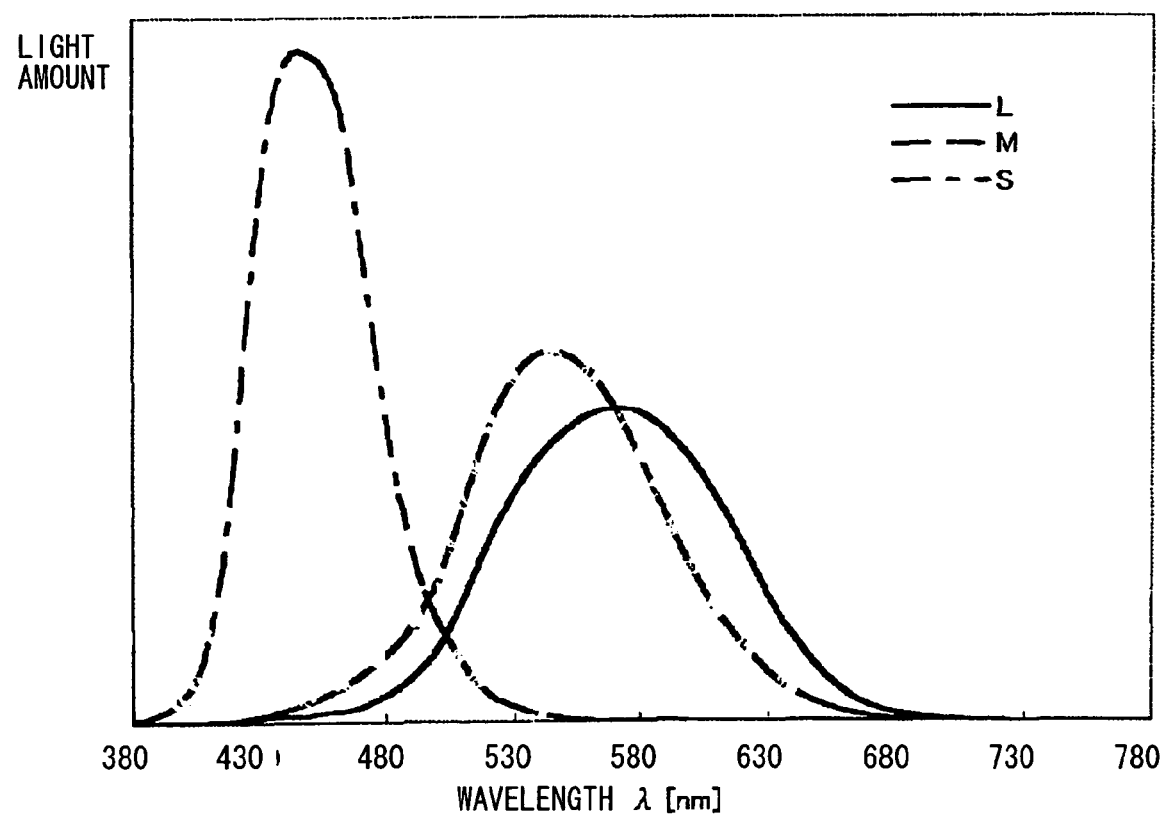
Figure 5:
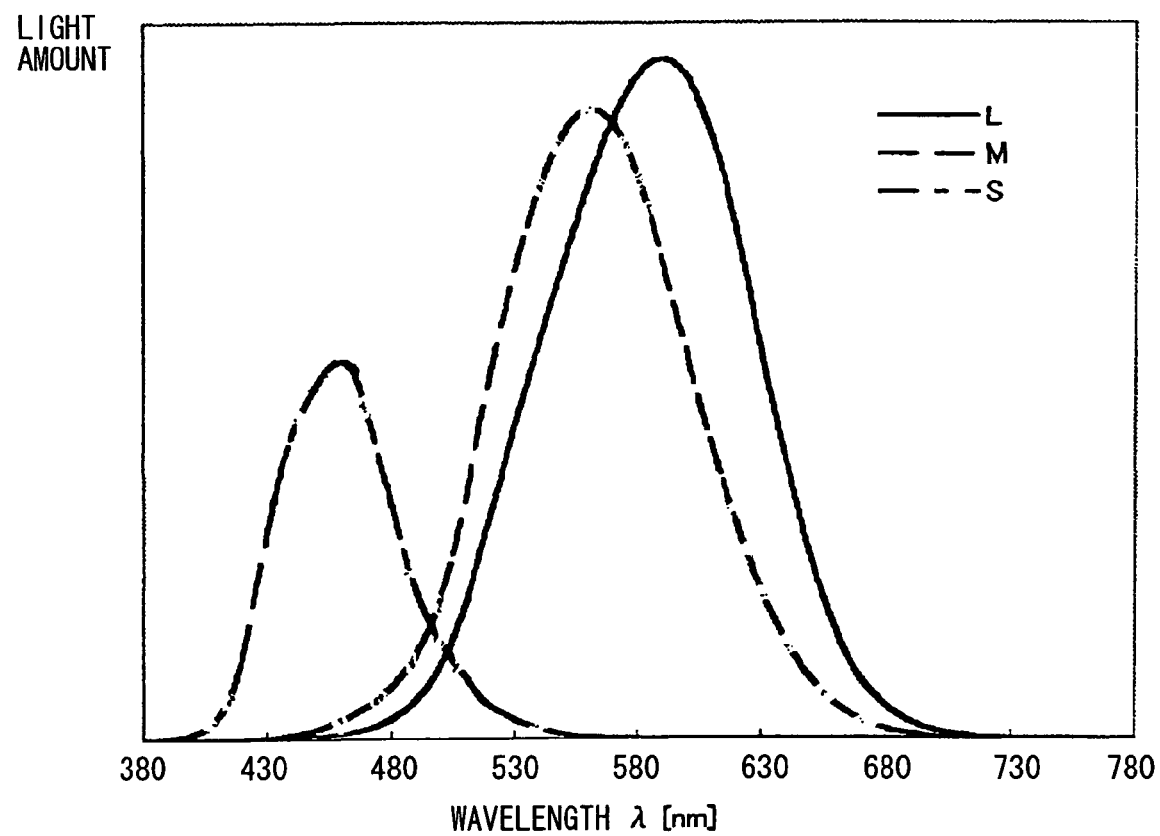

For instance, when white is observed under a D65 (with a color temperature of approximately 6500K) light source, $L_W$, $M_W$, $S_W$ each assume a value obtained by integrating the corresponding graph in FIG. 4 and the $L_W$, $M_W$ and $S_W$ values are substantially equal to one another. However, when white is observed under an A light source (with a color temperature of approximately 2854K), $L_W$, $M_W$, $S_W$ each assume a value obtained by integrating the corresponding graph in FIG. 5 with $L_W$ assuming a greater value compared to $S_W$. Namely, since the luminance (adapted luminance) sensed by each of the three cones L, M and S changes in correspondence to the spectral characteristics and the brightness of the illumination constituting the particular viewing condition, the extent of adaptation to the scene illumination condition or to the viewing condition, too, varies among the different cones. It is to be noted that while an explanation is given above in reference to an example in which white is viewed by the observer, the luminance sensed by the cones while an image or a scene is observed changes in correspondence to the average brightness of the image or the scene.

The present invention has been completed based upon the new findings outlined above.

The individual embodiments are now described.

First Embodiment

Figure 6:
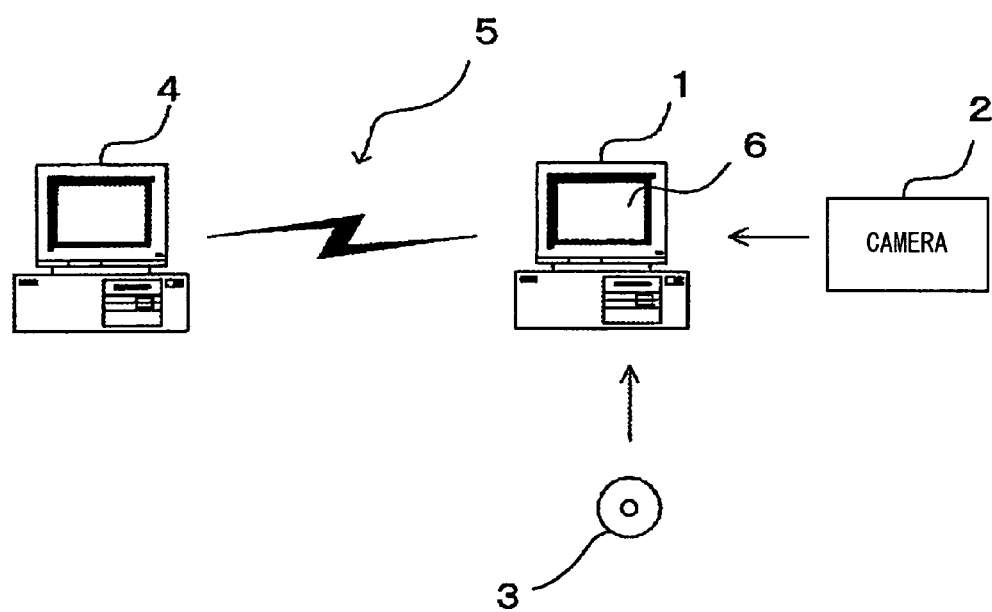

FIG. 6 shows the image processing device achieved in the embodiment of the present invention. The image processing device is constituted with a personal computer 1. The personal computer 1, connected with a digital camera 2, a recording medium 3 such as a CD-ROM, another computer 4 and the like, receives various types of image data. The personal computer 1 executes the image processing described below on the image data provided thereto. The computer 4 is connected via the Internet or another electrical communication network 5.

The program enabling the personal computer 1 to execute the image processing, which may be provided in a recording medium such as a CD-ROM or from another computer via the Internet or another electrical communication network through a system similar to that shown in FIG. 6, is installed in the computer 1. At the personal computer 1, constituted with a CPU (not shown), a memory (not shown), peripheral circuits (not shown), a monitor 6 and the like, the installed program is executed by the CPU.

The program may be provided via the Internet or another electrical communication network as a signal on a carrier wave on the electrical communication network, i.e., on a carrier wave that carries the transmission medium. In short, the program can be distributed as a computer-readable computer program product in any of various modes including a recording medium and a carrier wave.

The personal computer 1 in the embodiment converts image data obtained through photographing operation executed under photographic scene illumination conditions to image data reproducing the color appearance in correspondence to image viewing conditions different from the photographic scene illumination conditions by taking into consideration the chromatic adaptation characteristics of human visual perception.

Accordingly, illumination white point data corresponding to the illumination used in the photographic scene and the illumination used for the image observation are obtained in order to determine the types of photographic scene illumination and the image observation illumination and an adaptation factor D is calculated for each of the three primary colors L, M and S in the cones color space, i.e., in correspondence to parameters each representing a specific color, based upon the illumination white point of each type of illumination.

Figure 7:
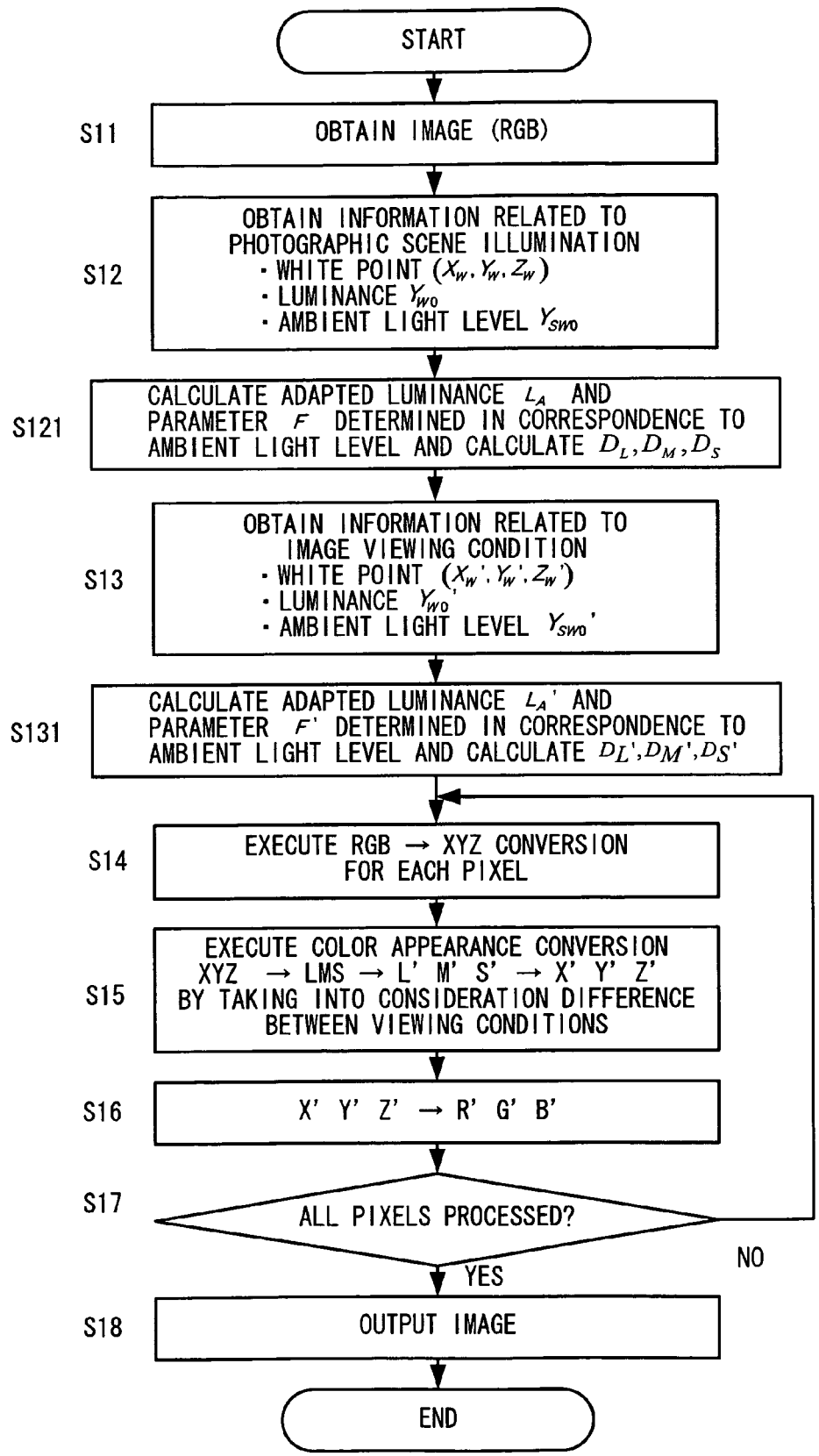

FIG. 7 presents a flowchart of the processing executed in the personal computer 1 in the first embodiment.

First, a photographic image is obtained in step S11. The photographic image, constituted of a plurality of pixels. The pixel values (colors) assumed at the photographic pixels are described based upon three parameters, i.e., R, G and B in the RGB color space inherent to the camera spectral sensitivity characteristics.

The operation then proceeds to step S12. In step S12, information related to the photographic scene illumination is obtained. Namely, information indicating the illumination white point $(X_w, Y_w, Z_w)$ and the luminance $Y_{w0}$ of the photographic scene illumination and the ambient light level $Y_{sw0}$ in the environment where the image is photographed, indicated in the CIE1931XYZ colorimetric system, is obtained. For instance, values input by the user (observer) via a keyboard, indicating the results obtained by measuring the white point and the luminance via a spectroradiometer or the like, may be read. Alternatively, the photographic scene illumination white point $(X_w, Y_w, Z_w)$ may be calculated by engaging the auto white balance function of the digital camera and the photographic scene illumination brightness $Y_{w0}$ may be calculated by analyzing the results provided by engaging the photometering function, which is utilized for purposes of automatic exposure adjustment. The ambient light level $Y_{sw0}$ may be calculated based upon the results obtained by executing photometering over a wider range. As an alternative, a value indicated in information input in advance by the photographer and appended to the image or a value input by the photographer via a keyboard may be used as the ambient light level $Y_{sw0}$.

The illumination white point $(X_w, Y_w, Z_w)$ for the photographic scene may be converted to a value in the LMS coordinate system. The value resulting from this conversion is designated as $(L_W, M_W, S_W)$.

[Expression 3]

$$\begin{pmatrix} L_W \\ M_W \\ S_W \end{pmatrix} = M_{CAT02} \cdot \begin{pmatrix} X_W \\ Y_W \\ Z_W \end{pmatrix} \quad (6)$$

It is to be noted that $M_{CAT02}$ is a conversion matrix used when converting the data in the CIE1931XYZ calorimetric system to data in the cones color space LMS optimal for the chromatic adaptation transform defined in the CIE. More precisely, the conversion matrix is expressed as in (7) below.

[Expression 4]

$$M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (7)$$

In step S121, an adapted luminance, and a parameter F, which is determined based upon the ambient light level, are calculated by using the information related to the photographic scene illumination having been obtained in step S12. F is determined in the embodiment through interpolation based upon the ratio of the luminance $Y_{w0}$ in the photographic scene and the ambient light level $Y_{sw0}$ in the photographic scene by referencing a table defined in the CIECAM02. In addition, the adapted luminance $L_A$ is calculated as $Y_{w0}/5$. However, the adapted luminance $L_A$ or the parameter F may be calculated through a different method. For instance, the adapted luminance $L_A$ may be estimated based upon the average brightness level for the entire image or it may be calculated as; $L_A = m \cdot Y_{w0}/100$ with m indicating the percentage (%) of the average brightness level for the entire image relative to the white brightness value.

Next, adaptation factors $D_L$, $D_M$ and $D_S$ respectively corresponding to the L, M and S values are calculated based upon the white point $(L_W, M_W, S_W)$ in the cones color space calculated in step S12 and the adapted luminance $L_A$ and the parameter F. It is to be noted that the values of the adaptation factors can be calculated as expressed in (8)~(10).

[Expression 5]

$$D_L = F \cdot \left[1 - \left(\frac{1}{3.6}\right) e^{\left(\frac{-(L_A \cdot L_W/M_W + 42)}{92}\right)}\right] \quad (8)$$

$$D_M = F \cdot \left[1 - \left(\frac{1}{3.6}\right) e^{\left(\frac{-(L_A + 42)}{92}\right)}\right] \quad (9)$$

$$D_S = F \cdot \left[1 - \left(\frac{1}{3.6}\right) e^{\left(\frac{-(L_A \cdot S_W/M_W + 42)}{92}\right)}\right] \quad (10)$$

In step S13, information related to the image viewing condition is obtained. Assuming that an image on display at a monitor is observed under a standard viewing condition, the image viewing condition is the sRGB standard viewing condition (white point=D65, luminance $Y_{device0}'=80$ Cd/m$^2$, ambient light level $Y_{sw0}'=4.1$ Cd/m$^2$). If, on the other hand, the image is observed under a viewing condition other than the sRGB standard viewing condition or an image printout is observed, the personal computer 1 reads the device white point $(X_{device}', Y_{device}', Z_{device}')$ and the device luminance $Y_{device0}'$ of the device used for the image observation and the ambient light white point $(X_{sw}', Y_{sw}', Z_{sw}')$ and the ambient light level $Y_{sw0}'$, input by the user (observer) via a keyboard or the like and determines the illumination white point $(X_w', Y_w', Z_w')$ by integrating the device white point and the ambient light white point and the corresponding luminance $Y_{w0}'$ in the image viewing condition.

More specifically, the white point $(X_w', Y_w', Z_w')$ is calculated as expressed in (11)~(15) below based upon a ratio $R_{mix}'$ of the influences of the device light source used for the image observation and the ambient light source.

[Expression 6]

$$\begin{pmatrix} L'_{device} \\ M'_{device} \\ S'_{device} \end{pmatrix} = M_{CAT02} \begin{pmatrix} X'_{device} \\ Y'_{device} \\ Z'_{device} \end{pmatrix} \quad (11)$$

$$\begin{pmatrix} L'_{SW} \\ M'_{SW} \\ S'_{SW} \end{pmatrix} = M_{CAT02} \begin{pmatrix} X'_{SW} \\ Y'_{SW} \\ Z'_{SW} \end{pmatrix} \quad (12)$$

$$L'_W = \frac{R'_{mix} \cdot Y'^{1/3}_{device0} \cdot L'_{device} + (1 - R'_{mix}) \cdot Y'^{1/3}_{SW0} \cdot L'_{SW}}{R'_{mix} \cdot Y'^{1/3}_{device0} + (1 - R'_{mix}) \cdot Y'^{1/3}_{SW0}} \quad (13)$$

$$M'_W = \frac{R'_{mix} \cdot Y'^{1/3}_{device0} \cdot M'_{device} + (1 - R'_{mix}) \cdot Y'^{1/3}_{SW0} \cdot M'_{SW}}{R'_{mix} \cdot Y'^{1/3}_{device0} + (1 - R'_{mix}) \cdot Y'^{1/3}_{SW0}}$$

$$S'_W = \frac{R'_{mix} \cdot Y'^{1/3}_{device0} \cdot S'_{device} + (1 - R'_{mix}) \cdot Y'^{1/3}_{SW0} \cdot S'_{SW}}{R'_{mix} \cdot Y'^{1/3}_{device0} + (1 - R'_{mix}) \cdot Y'^{1/3}_{SW0}}$$

$$\begin{pmatrix} X'_W \\ Y'_W \\ Z'_W \end{pmatrix} = (M_{CAT02})^{-1} \begin{pmatrix} L'_W \\ M'_W \\ S'_W \end{pmatrix} \quad (14)$$

$$Y'_{W0} = (R'_{mix} \cdot Y'^{1/3}_{device0} + (1 - R'_{mix}) \cdot Y'^{1/3}_{SW0})^3 \quad (15)$$

In step S131, an adapted luminance $L_A'$, a parameter F', which is determined based upon the ambient light level, are calculated by using the information related to the image viewing condition having been obtained in step S13. The parameter F' is determined in the embodiment through interpolation based upon the ratio of the brightness $Y_{w0'}$ constituting the viewing condition and the ambient light level $Y_{sw0}'$ constituting the viewing condition by referencing a table defined in the CIECAM02. In addition, $L_A'$ is calculated as $L_A'=Y_{w0}'/5$. However, the adapted luminance $L_A'$ or the parameter F' may be calculated through a different method as with the adapted luminance or the parameter calculated in step S121.

Next, adaptation factors $D_L'$, $D_M'$ and $D_S'$ respectively corresponding to the L, M and S values are calculated based upon the white point ($L_W'$, $M_W'$, $S_W'$) in the cones color space calculated in step S13 and the adapted luminance $L_A'$ and the parameter F'. It is to be noted that the values of the adaptation factors can be calculated as expressed in (16)~(18).

[Expression 7]

$$D_L' = F' \cdot \left[1 - \left(\frac{1}{3.6}\right) e^{\left(\frac{-(L_A' \cdot L_W'/M_W' + 42)}{92}\right)}\right] \quad (16)$$

$$D_M' = F' \cdot \left[1 - \left(\frac{1}{3.6}\right) e^{\left(\frac{-(L_A' + 42)}{92}\right)}\right] \quad (17)$$

$$D_S' = F' \cdot \left[1 - \left(\frac{1}{3.6}\right) e^{\left(\frac{-(L_A' \cdot S_W'/M_W' + 42)}{92}\right)}\right] \quad (18)$$

The operation then proceeds to step S14. Since the pixels in the input image are expressed based upon the three parameters, i.e., R, G and B, in the RGB colorimetric system which is a color space inherent to the spectral sensitivity characteristics of the camera, the data are converted to data in the CIE1931XYZ color space (expression (19)) by using a matrix $M_{RGB \to XYZ}$ so as to convert the values expressed in the predetermined RGB colorimetric system to those in the XYZ coordinate system.

[Expression 8]

$$\begin{pmatrix} X \\ Y \\ Z \end{pmatrix} = M_{RGB \to XYZ} \cdot \begin{pmatrix} R \\ G \\ B \end{pmatrix} \quad (19)$$

Next, the operation proceeds to step S15 to calculate the color achieving under the viewing illumination condition a color appearance similar to the color perceived under the photographic scene illumination condition based upon the difference between the viewing conditions having been read in steps S12 and S13 and $D_L$, $D_M$, $D_S$, $D_L'$, $D_M'$ and $D_S'$ having been calculated in steps S121 and S131.

Any chromatic adaptation transform model that factors in the difference between the viewing conditions, such as the CIECAM02 or the von Kreis chromatic adaptation model, may be used as the color appearance model in this step. In conjunction with the CIECAM02 model, $D_L$, $D_M$ and $D_S$ having been calculated in step S121, instead of the adaptation factor D calculated as expressed in the defining expression, should be respectively applied to the cones responses resulting from the conversion executed by using the CAT02 matrix when converting the pixel value XYZ expressed in the CIE1931 calorimetric system to a JCh value defined in the CIECAM02 and $D_L'$, $D_M'$ and $D_S'$ having been calculated in step S131 may be used in the reverse conversion from JCh to X'Y'Z'. In conjunction with the von Kreis, chromatic adaptation transform model, the color conversion should be executed by using expressions (20)~(23).

[Expression 9]

$$\begin{pmatrix} X' \\ Y' \\ Z' \end{pmatrix} = (M_{CAT02})^{-1} \cdot M_h \cdot M_{CAT02} \cdot \begin{pmatrix} X \\ Y \\ Z \end{pmatrix} \quad (20)$$

provided with $$M_h = \begin{pmatrix} L_{W,D}'/L_{W,D} & 0.0 & 0.0 \\ 0.0 & M_{W,D}'/M_{W,D} & 0.0 \\ 0.0 & 0.0 & S_{W,D}'/S_{W,D} \end{pmatrix} \quad (21)$$

$$L_{W,D} = \frac{L_W}{Y_W \cdot D_L + L_W \cdot (1 - D_L)} \quad (22)$$

$$M_{W,D} = \frac{M_W}{Y_W \cdot D_M + M_W \cdot (1 - D_M)}$$

$$S_{W,D} = \frac{S_W}{Y_W \cdot D_S + S_W \cdot (1 - D_S)}$$

$$L_{W,D}' = \frac{L_W'}{Y_W' \cdot D_L' + L_W' \cdot (1 - D_L')} \quad (23)$$

$$M_{W,D}' = \frac{M_W'}{Y_W' \cdot D_M' + M_W' \cdot (1 - D_M')}$$

$$S_{W,D}' = \frac{S_W'}{Y_W' \cdot D_S' + S_W' \cdot (1 - D_S')}$$

The operation proceeds to step S16, in which the pixel value X'Y'Z' expressed in the CIE1931XYZ calorimetric system is converted to a value in the color space R'G'B', in which the output image is to be described. The conversion is executed as expressed in (24) below. $M_{XYZ \to sRGB}$ is a matrix used to convert the individual XYZ data values to data in the color space RGB to be used as the output image and assuming that the output image is expressed with data in the color space sRGB, a matrix predetermined in conformance to the standard can be used.

[Expression 10]

$$\begin{pmatrix} R' \\ G' \\ B' \end{pmatrix} = M_{XYZ \to sRGB} \cdot \begin{pmatrix} X' \\ Y' \\ Z' \end{pmatrix} \quad (24)$$

In step S17, a decision is made as to whether or not the processing in steps S14 through S16 has been executed on all the pixels. If the processing on all the pixels has not been completed, the operation returns to step S14 to repeatedly execute the processing described above. Once all the pixels have undergone the processing, the operation proceeds to step S18 to output the image before ending the processing.

Through the processing described above, the color appearance can be accurately reproduced even when the scene where an image is photographed and the environment where the photographic image is observed are illuminated under different illumination conditions. The image processing device in the embodiment described above, which executes conversion by using the optimal adaptation factors each corresponding to one of the physiological primary colors of visual perception, is capable of accurately predicting the color appearance even though the same adaptation factors are utilized regardless of the hue of the conversion target pixel.

Expressions (8)~(10) and (16)~(18) used to calculate the adaptation factors as described above indicate that the adaptation factors are adjusted in correspondence to the ratios of the amounts of light entering the L, M and S cones. More specifically, the adaptation factors are each set to assume a larger value when the quantity of light sensed by the cone cells of the observer observing white is greater.

In the embodiment, the color conversion is executed to accurately reproduce the color appearance in the LMS space, which is a cones response color space. Thus, color conversion that best suits the characteristics of human visual perception is enabled.

Second Embodiment

Next, an embodiment that enables an image processing device such as that installed in a digital camera or the like, which does not have superior arithmetic processing capability, to execute the optimal color conversion at high speed, is described.

One of the features characterizing the embodiment is that the arithmetic processing load can be greatly reduced by eliminating any arithmetic operation that requires matrix conversion.

Figure 8:
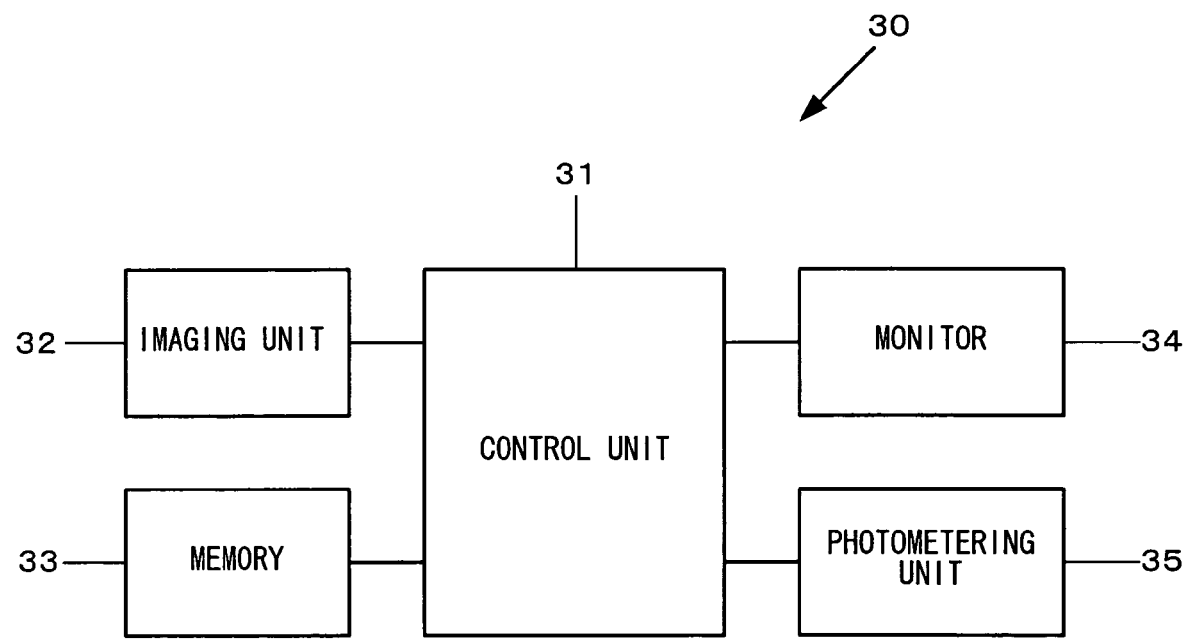

FIG. 8 shows the structure adopted in a digital camera 30 achieved in the embodiment. The digital camera 30 comprises a control unit 31, an imaging unit 32, a memory 33, a monitor 34, a photometering unit 35 and the like. The monitor 34 is a liquid crystal monitor mounted at the rear of the digital camera 30.

The control unit 31, constituted with a microprocessor, peripheral circuits and the like, executes various types of control for the digital camera 30 and the image processing to be detailed later by executing programs stored in the memory 33. The imaging unit 32, constituted with an image sensor such as a CCD, converts a light flux originating from the subject and received therein via a photographic optical system (not shown) such as a photographic lens, to electrical signals, digitizes the electrical signals resulting from the conversion and outputs digital image data. The imaging unit 32, equipped with RGB color filters, outputs image data generated based upon parameters used in the RGB calorimetric system.

Figure 9:
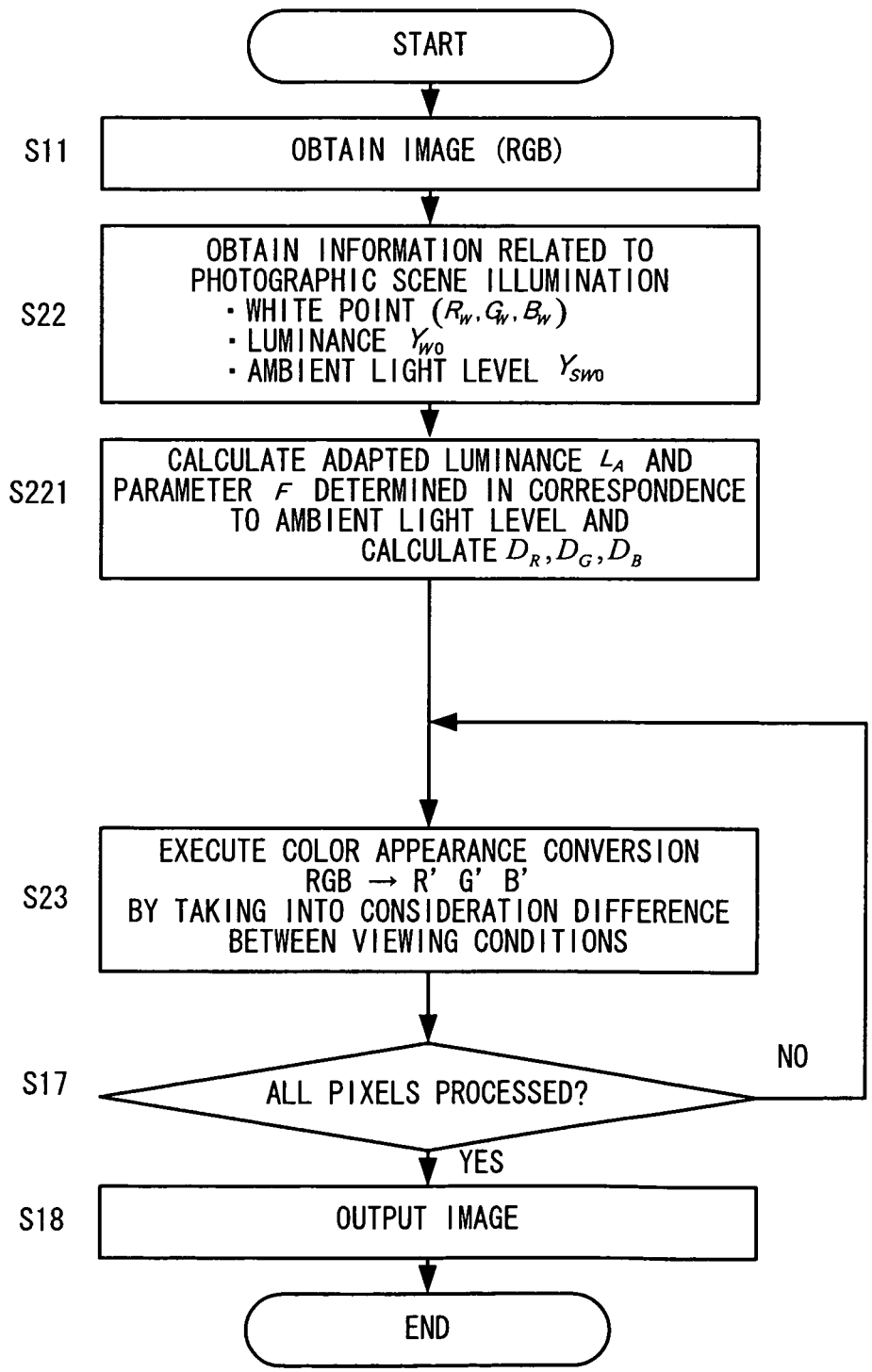

The image processing executed in the control unit 31 of the digital camera 30 is described in reference to FIG. 9. It is to be noted that the same step numbers are assigned to the steps in which processing identical to that executed in the first embodiment, as shown in FIG. 7 is executed, so as to preclude the necessity for a repeated explanation thereof.

In step S11, a photographic image captured by the imaging unit 32 is obtained. In step S22, information related to the photographic scene is obtained. Specific details of the processing executed in this step are similar to those of the processing executed in the first embodiment, except that an output $(R_W, G_W, B_W)$ from the image sensor, generated for white, is obtained by engaging the auto-white balance function of the digital camera to be used as the photographic scene white point, instead of the calorimetric value $(X_W, Y_W, Z_W)$ measured via a spectrocolorimeter.

The processing then proceeds to step S221 to calculate the adapted luminance $L_A$ and the parameter F determined in correspondence to the ambient light level and also calculate the adaptation factors $D_R$, $D_G$ and $D_B$ respectively corresponding to R, G and B based upon the white point $(R_W, G_W, B_W)$. The adapted luminance $L_A$ and the parameter F determined in correspondence to the ambient light level may be calculated as in the first embodiment. The adaptation factors $D_R$, $D_G$ and $D_B$ may be calculated as expressed in (25)~(27) below.

[Expression 11]

$$D_R = F \cdot \left[1 - \left(\frac{1}{3.6}\right) e^{\left(\frac{-(L_A \cdot R_W/M_W + 42)}{92}\right)}\right] \quad (25)$$

$$D_G = F \cdot \left[1 - \left(\frac{1}{3.6}\right) e^{\left(\frac{-(L_A + 42)}{92}\right)}\right] \quad (26)$$

$$D_B = F \cdot \left[1 - \left(\frac{1}{3.6}\right) e^{\left(\frac{-(L_A \cdot B_W/G_W + 42)}{92}\right)}\right] \quad (27)$$

Next, the operation proceeds to step S23 to convert the pixel value in correspondence to the color appearance by taking into consideration the extent of adaptation. A conversion method that may be adopted in this step is expressed in (28) below.

[Expression 12]

$$R' = R \cdot (G_W \cdot D_R + R_W (1 - D_R))/R_W$$

$$G' = G$$

$$B' = B \cdot (G_W \cdot D_B + B_W (1 - D_B))/B_W \quad (28)$$

The processing in step S23 is repeatedly executed until it is decided in step S17 that the processing for all the pixels has been completed. Once all the pixels have undergone the processing, the operation proceeds to step S18 to output image data constituted with pixel values resulting from the conversion executed for accurate color appearance reproduction before the processing ends.

In the embodiment, color appearance conversion is executed by taking into consideration the extent of adaptation and thus, better color appearance reproduction is achieved through simple processing executed within the camera. It is to be noted that by executing the processing in the embodiment as an alternative to the white balance processing executed in a digital camera in the related art, an effect equivalent to that of white balance processing is realized.

In the digital camera achieved in the second embodiment, the adaptation factors $D_R$, $D_G$ and $D_B$ corresponding to the individual colors are calculated entirely based upon the white point in the photographic scene, as an alternative to the white balance processing executed in the related art. Now, digital camera capable of reproducing a color appearance in an image displayed at a liquid crystal monitor mounted at the rear of a digital camera, which is close to the appearance of color as perceived in the photographic scene is described in reference to the third embodiment.

Third Embodiment

The digital camera achieved in the third embodiment of the present invention assumes a structure identical to that of the digital camera in the second embodiment.

Figure 10:
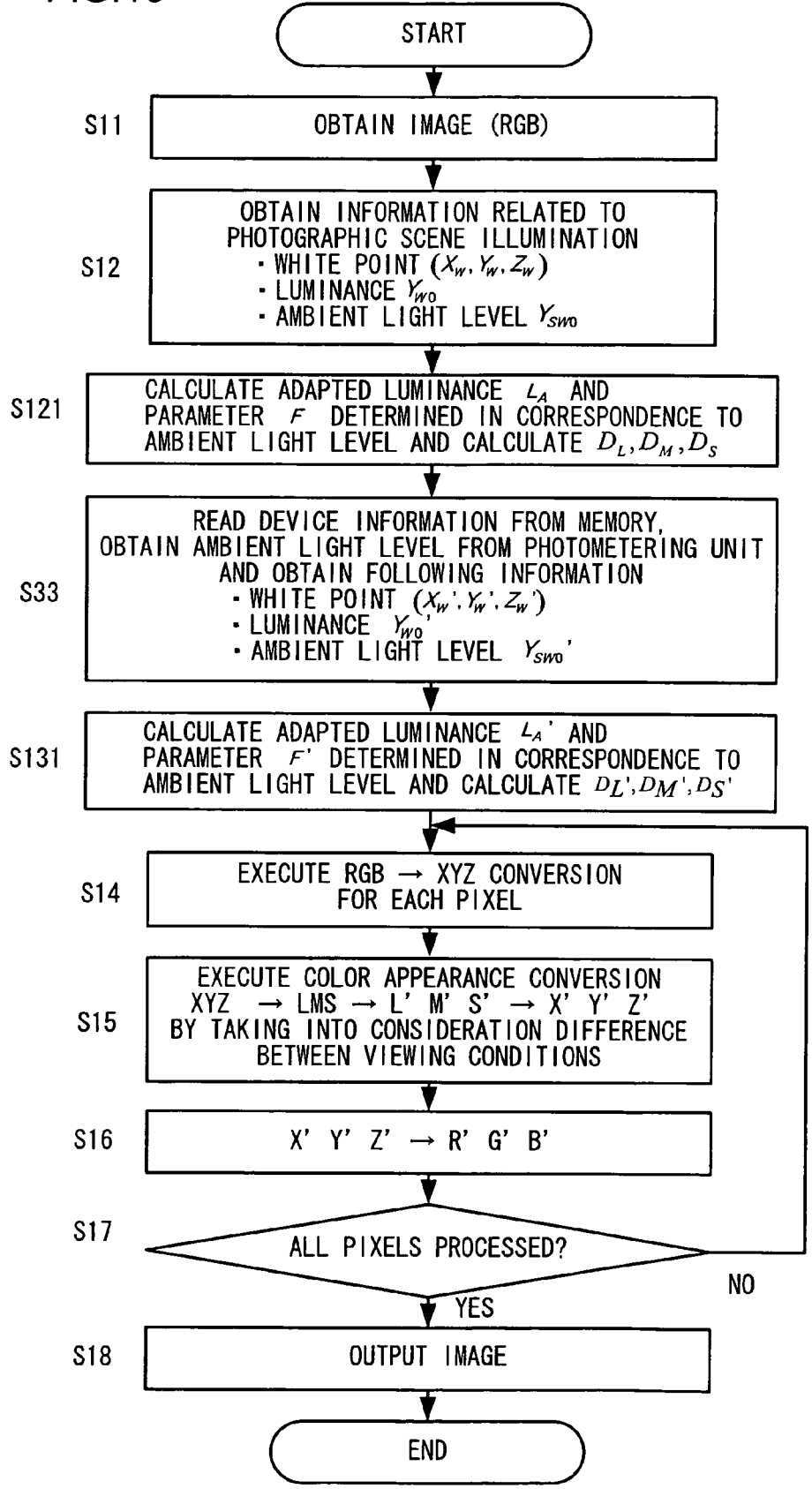

Next, the image processing executed in the third embodiment is described in reference to the flowchart presented in FIG. 10. It is to be noted that the same step numbers are assigned to steps in which processing similar to that executed in the first embodiment, as shown in FIG. 7, is executed so as to preclude the necessity for a repeated explanation thereof.

In steps S11~S121, a photographic image captured by the imaging unit 32 is obtained, the adapted luminance $L_A$ and the parameter F determined in correspondence to the ambient light level are calculated and the adaptation factors $D_L$, $D_M$ and $D_S$ are calculated. Specific details of the processing executed in these steps are similar to those of the processing executed in the first embodiment.

In step S33, information related to the image viewing condition is obtained. The image observation device used for the image observation in this embodiment is the monitor 34 at the digital camera 30. Accordingly, the white point and the luminance of the monitor 34 stored in advance in the memory 33 are read out and respectively designated as the device white point ($X_{device}'$, $Y_{device}'$, $Z_{device}'$) and the device luminance $Y_{device0}'$ in this step. In addition, the ambient light level is calculated by engaging the photometering function of the photometering unit 35 installed in the digital camera and the calculated ambient light level is set as the ambient light level $Y_{sw0}'$. The ambient illuminating light source may be determined by checking the white balance data for the most recently photographed image and the white point of this light source may be read and designated as the ambient white point ($X_{sw}'$, $Y_{sw}'$, $Z_{sw}'$). Based upon the data thus read, an illumination white point ($X_w'$, $Y_w'$, $Z_w'$) constituting the image viewing condition is calculated as the combination of the device white point and the ambient light white point and the corresponding brightness $Y_{w0}'$ is calculated. Since they can be calculated through a method similar to that explained in reference to the first embodiment, a repeated explanation is not provided.

The processing executed in steps S131~S18 is similar to that executed in the first embodiment. The image output and brought up on display on the monitor 34 in step S18 assumes an appearance close to that of the actual photographic scene, achieved through simple processing even when entry of the viewing condition information by the user is skipped.

It is to be noted that the ambient light white point obtained in step S33 as the information related to the image viewing condition may be the white point read in correspondence to the viewing light source selected by the user from a menu listing, for instance, sunny, cloudy, incandescent and fluorescent.

In addition, while an explanation is given above on an example in which the image is brought up on display at the monitor 34 mounted at the rear side of the digital camera 30, the present invention may be adopted equally effectively when an image is brought up on display at an eyepiece viewfinder of the digital camera 30 instead of the monitor 34. In such an application, the processing should be executed simply in conjunction with the eyepiece viewfinder instead of at the monitor 34, e.g., reading the illumination white point and the luminance of the eyepiece viewfinder in step S33 and bringing up on display the output image at the eyepiece viewfinder in step S18, in order to reproduce an appearance close to that of the actual scene at the eyepiece viewfinder.

Fourth Embodiment

An explanation is given above in reference to the first through third embodiments on an example in which a photographic image undergoes color conversion to generate an image to be observed on a monitor or as a printout by taking into consideration the difference between the photographic scene illumination condition and the image viewing condition.

However, an image resulting from color conversion executed by taking into consideration the predicted color appearance under a given viewing condition may be actually observed under a viewing condition different from the initially anticipated viewing condition. For instance, an image resulting from a color conversion executed by anticipating that the image will be observed under a given viewing condition (e.g., as an image brought up on display at a monitor) may actually be observed under a viewing condition different from the anticipated viewing condition (e.g., as a hard copy printout). The difference between the processing executed under such circumstances and the processing executed in the first embodiment is now explained in reference to FIG. 7.

It is to be noted that the following description is given by referring to the anticipated viewing condition as the first viewing condition and referring to the actual viewing condition under which the image is to be observed as second viewing condition.

In step S11, image data having undergone color conversion executed for the first viewing condition are obtained. In step S12, information related to the first viewing condition is obtained instead of the information related to the photographic scene illumination. The information related to the first viewing condition mentioned above based upon which the input image data having been created, indicates the illumination condition at the device used for input image data observation and the ambient light condition in the surrounding environment. If the image data do not include any data related to the first viewing condition, the conditions in the sRGB standard viewing condition (white point=D65, luminance $Y_{device0}$=80 $Cd/m^2$, ambient light white point=D50, ambient light level $Y_{sw0}$=4.1 $Cd/m^2$) may be as such. Then, the illumination white point ($X_w$, $Y_w$, $Z_w$) to constitute the first viewing condition is calculated by incorporating the device white point and the ambient light white point and the corresponding luminance $Y_{w0}$ is also calculated.

If the image data have undergone color conversion to be observed under a viewing condition other than the sRGB standard viewing condition, the device white point ($X_{device}$, $Y_{device}$, $Z_{device}$) and the luminance $Y_{device0}$, the ambient light white point ($X_{sw}$, $Y_{sw}$, $Z_{sw}$) and the ambient light level $Y_{sw0}$, based upon which the image has been created may be read and the illumination white point ($X_w$, $Y_w$, $Z_w$) to constitute the first image viewing condition may be calculated by incorporating the device white point and the ambient light white point and the corresponding luminance $Y_{w0}$ may also be calculated.

In step S121, processing similar to that executed in step S121 in the first embodiment as shown in FIG. 7 is executed by using the data obtained in step S12. In step S13, information related to the second viewing condition is obtained. The information related to the second viewing condition indicates the illumination condition at the device used for the actual output image data observation and the ambient light in the environment. Namely, the illumination white point ($X_{device}'$, $Y_{device}'$, $Z_{device}'$), the luminance $Y_{device0}'$ of the illumination used when observing the output image, the ambient light white point ($X_{SW}'$, $Y_{SW}'$, $Z_{SW}'$) and the ambient light level $Y_{SW0}'$ are entered by the user via a keyboard or the like and the cones response data ($X_W'$, $Y_W'$, $Z_W'$) of the illumination white point incase that visual perception is adapted under the output image viewing condition is calculated as a combination of the device white point and the ambient light white point and the corresponding luminance $Y_{W0}'$ is also calculated.

For instance, when the output image is observed as a printout, the cones response data ($X_W'$, $Y_W'$, $Z_W'$) and the luminance $Y_{W0}'$ may be calculated based upon the white point ($X_{device}'$, $Y_{device}'$, $Z_{device}'$) and the luminance $Y_{device0}'$ of the illumination used when viewing the output image, the ambient light white point ($X_{SW}'$, $Y_{SW}'$, $Z_{SW}'$) and the ambient light level $Y_{SW0}'$ entered by the user (observer) via a keyboard or the like. Alternatively, the calculation may be executed based upon the standard print out viewing condition.

If the output image is to be displayed via a projector, the following values, entered by the user with a keyboard or the like, may be used. For the white point ($X_{device}'$, $Y_{device}'$, $Z_{device}'$) and the luminance $Y_{device0}'$ corresponding to the projector device, data included in the specifications or values obtained by the user through actual measurements may be used. For the ambient light white point ($X_{sw}'$, $Y_{sw}'$, $Z_{sw}'$) and the ambient light level $Y_{sw0}'$, $Y_{sw0}'=0$ and ($X_{sw}'$, $Y_{sw}'$, $Z_{sw}'$)= ($X_{device}'$, $Y_{device}'$, $Z_{device}'$) may be entered if the image is to be observed in a dark room. Otherwise, the values obtained by the user by measuring the viewing condition may be entered.

As in the first embodiment, the illumination white point ($L_w'$, $M_w'$, $S_w'$) constituting the viewing environment and the corresponding luminance $Y_{w0}'$ are calculated by using the ratio $R_{mix}'$ of the influences of the device light source used for the output image observation and the ambient illuminating light source.

The processing executed in step S131 is similar to that executed in step S131 in the first embodiment, as shown in FIG. 7, by using the data obtained in step S13. The processing executed in step as S14 and subsequent steps is similar to that executed in the first embodiment.

Variation of the Fourth Embodiment

When displaying a previously obtained image on a display device assuming a different illumination white point, e.g., when a given image, projected via a projector, is viewed by an audience while the image presenter views the same image on a different display device such as a liquid crystal display, the color appearances of the image viewed by the audience and the image viewed by the presenter will not match unless color conversion factoring in the color appearance is executed for the data constituting either display image. Under such circumstances, processing similar to that executed in the fourth embodiment may be executed to ensure that the color appearance is reproduced accurately.

For instance, processing may be executed to reproduce the appearance of the color of an image on display at the liquid crystal display being viewed by the image presenter in a display image displayed via a projector and being viewed by an audience. It is to be noted that in the following description, the image on display at the liquid crystal display is referred to as an "input image" and the image projected via the projector is referred to as an "output image".

The following description is given in reference to the flowchart presented in FIG. 7. In step S11, the input image is obtained. Next, in step S12, information related to the viewing condition at the liquid crystal display is obtained instead of the information related to the photographic scene illumination. The information related to the viewing condition indicates conditions at the light source used at the liquid crystal display unit and conditions of the ambient light. The sRGB standard viewing condition (white point=D65, luminance $Y_{device0}$=80 Cd/m$^2$, ambient light white point=D50, ambient light level $Y_{sw0}$=4.1 Cd/m$^2$) may be used as the viewing condition at the liquid crystal display unit. In such a case, the device white point and the ambience illumination white point in the sRGB standard viewing condition may be combined so as to ascertain the illumination white point ($X_W$, $Y_W$, $Z_W$) and the corresponding luminance $Y_{w0}$ under the first viewing condition.

In step S13, the illumination white point ($X_{device}'$, $Y_{device}'$, $Z_{device}'$), the luminance $Y_{device0}'$ of the illumination used when observing the output image, the ambient light white point ($X_{SW}'$, $Y_{SW}'$, $Z_{SW}'$) and the ambient light level $Y_{SW0}'$ are entered to be used as information related to the image viewing condition. Then the illumination white point ($X_W'$, $Y_W'$, $Z_W'$) in case that visual perception is adapted under the output image viewing condition is calculated as a combination of the device white point and the ambient light white point and the corresponding luminance $Y_{W0}'$ is calculated. Since such information can be entered in much the same way as in the fourth embodiment, a repeated explanation is not provided.

Since the processing executed in the other steps, i.e., steps S121, S131 and S14~S18, is identical to that executed in the first embodiment, as shown in FIG. 7, a repeated explanation is not provided.

By obtaining the information related to the different viewing conditions in steps S12 and S13 as described above, images, which reproduce the color appearance of the other accurately, can be displayed at different display devices under different viewing conditions.

Fifth Embodiment

While the adapted luminance $L_A$ and the adapted luminance $L_A'$ each assume a uniform value for the entire image in the description provided above, the adapted luminance levels may instead be calculated in correspondence to each some of pixels or each area. For instance, $L_A$ and $L_A'$ may be calculated as; adapted luminance levels $L_A$=y·$Y_{W0}/Y_W$ and $L_A'$=y·$Y_{w0}'/Y_W'$ based upon the absolute brightness levels $Y_{w0}$ and $Y_{w0}'$ of the white points and the relative brightness levels $Y_W$ and $Y_W'$, each by using the relative brightness value y representing the average of brightness values at a predetermined number of pixels including the conversion target pixel and surrounding pixels or a relative brightness value y of the representative color determined based upon the data at the conversion target pixel and surrounding pixels.

Figure 11:
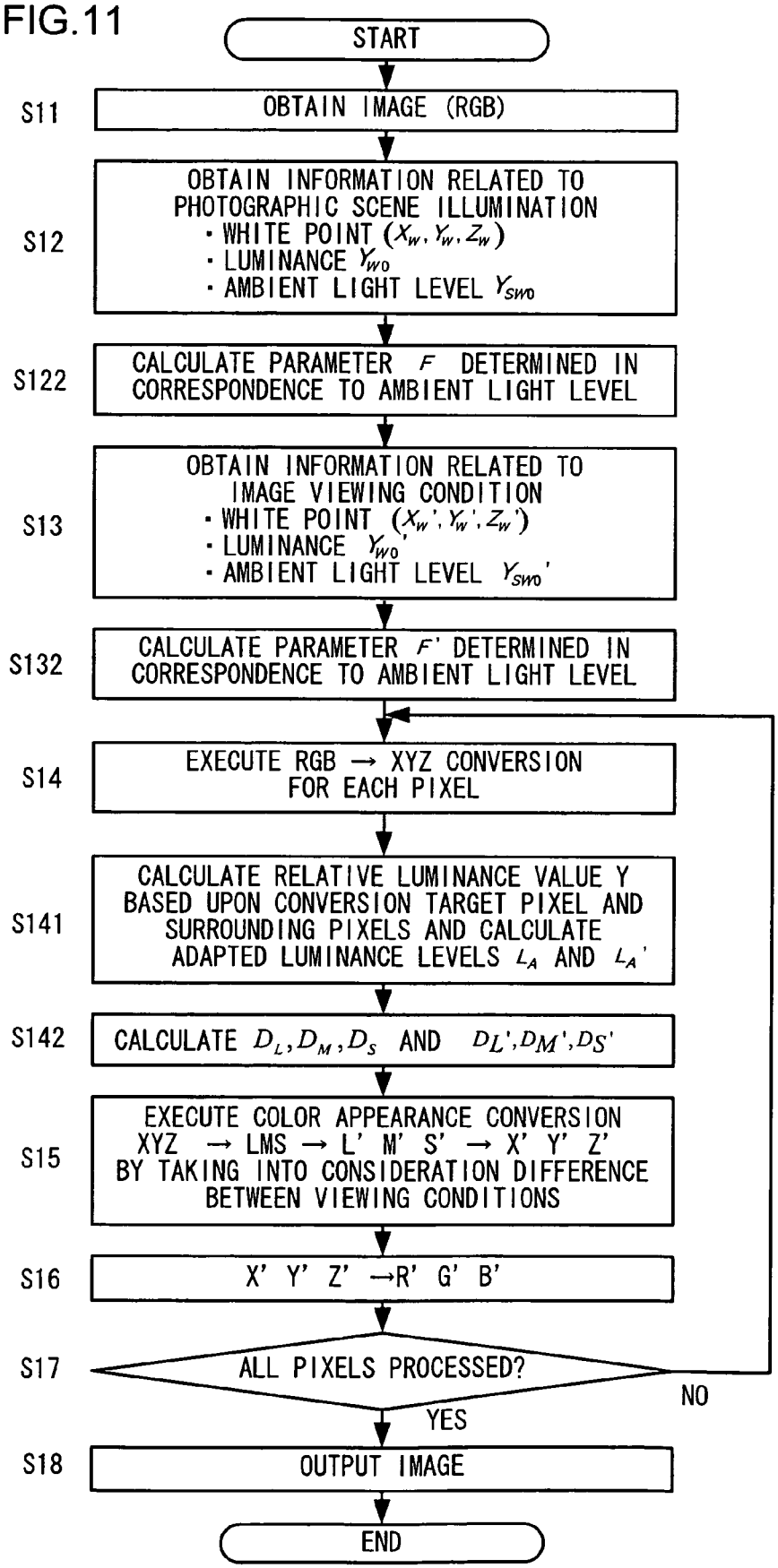

When this change is instituted in the first embodiment, the flow of processing executed by the personal computer 1 is modified as shown in FIG. 11.

Since the processing executed in steps S11 and S12 is similar to that executed in the first embodiment, as shown in FIG. 7, a repeated explanation is not provided. In step S122, the parameter F, which is determined in correspondence to the ambient light level, is calculated by using the information related to the photographic scene illumination, having been obtained in step S12. Since F can be determined as in step S121 in the first embodiment, a repeated explanation is not provided.

Since the processing executed in step S13 is similar to that executed in the first embodiment, as shown in FIG. 7, a repeated explanation is not provided.

In step S132, the parameter F', which is determined in correspondence to the ambient light level, is calculated by using the information related to the image viewing condition, having been obtained in step S13. Since F' can be determined as in step S131 in the first embodiment, a repeated explanation is not provided. Since the processing executed in step S14 is similar to that executed in the first embodiment, as shown in FIG. 7, accordingly, a repeated explanation is not provided.

In step S141, $L_A$ and $L_A'$ are calculated as expressed in (29) and (30) below based upon the average relative brightness y calculated by using the data at the conversion target pixel and a predetermined number of surrounding pixels, the absolute luminance levels $Y_{W0}$ and $Y_{W0}'$ of the individual illumination white points and the individual relative luminance level $Y_W$ and $Y_W'$.

[Expression 13]

$$L_A = y \cdot Y_{W0}/Y_W \quad (29)$$

$$L_A' = y \cdot Y_{W0}'/Y_W' \quad (30)$$

Next, the adaptation factors $D_L$, $D_M$, $D_S$, $D_L'$, $D_M'$, and $D_S'$, corresponding to the L cones, the M cones and the S cones are calculated by using the F and F' values having been determined in steps S122 and S132. Since the adaptation factors $D_L$, $D_M$, $D_S$, $D_L'$, $D_M'$, and $D_S'$ can be calculated as in steps S121 and S131 in the first embodiment, a repeated explanation is not provided.

Since the processing executed in steps S15 through S18 is similar to that executed in the first embodiment, as shown in FIG. 7, a repeated explanation is not provided.

As described above, the adapted luminance levels $L_A$ and $L_A'$ are calculated by using the average brightness y based upon the data at the target pixel and pixels surrounding the target pixel all of which are elements contributing to the actual adaptation. Through this process, the optimal adaptation factors can be set for each pixel. Consequently, color conversion that achieves even better color appearance reproduction is enabled. It is to be noted that this method may also be adopted in conjunction with the second through fourth embodiment.

It is also to be noted that the adapted luminance levels $L_A$ and $L_A'$ may be calculated by adopting a method other than that described above, as long as the adapted luminance levels can be determined in correspondence to each conversion target pixel.

Sixth Embodiment

In the first embodiment described earlier, a photographic image is designated as the input image and the appearance perceived by viewing the photographic scene is reproduced in an output image. In the fourth embodiment, an image created by assuming that it is to be observed under first viewing condition is actually observed under second viewing condition different from the first viewing condition.

Now, in reference to the sixth embodiment, an example in which an image being observed under the first viewing condition is also observed under another condition, i.e., the other second viewing condition, is described. The embodiment may be adopted to match the appearance of, for instance, a printout image with the appearance of an image observed at a monitor or to match the appearance of an image projected via a projector with the appearance of an image observed at a monitor. The embodiment may also be adopted to match the appearance of a monitor image observed under a given viewing condition and the appearance of an image resulting from a specific type of image processing executed while viewing the monitor image observed on a monitor under another viewing condition. Namely, the color appearance as perceived under the second viewing condition in which the output image is observed is matched with the color appearance as perceived under the first viewing condition in which the input image is observed.

Figure 12:
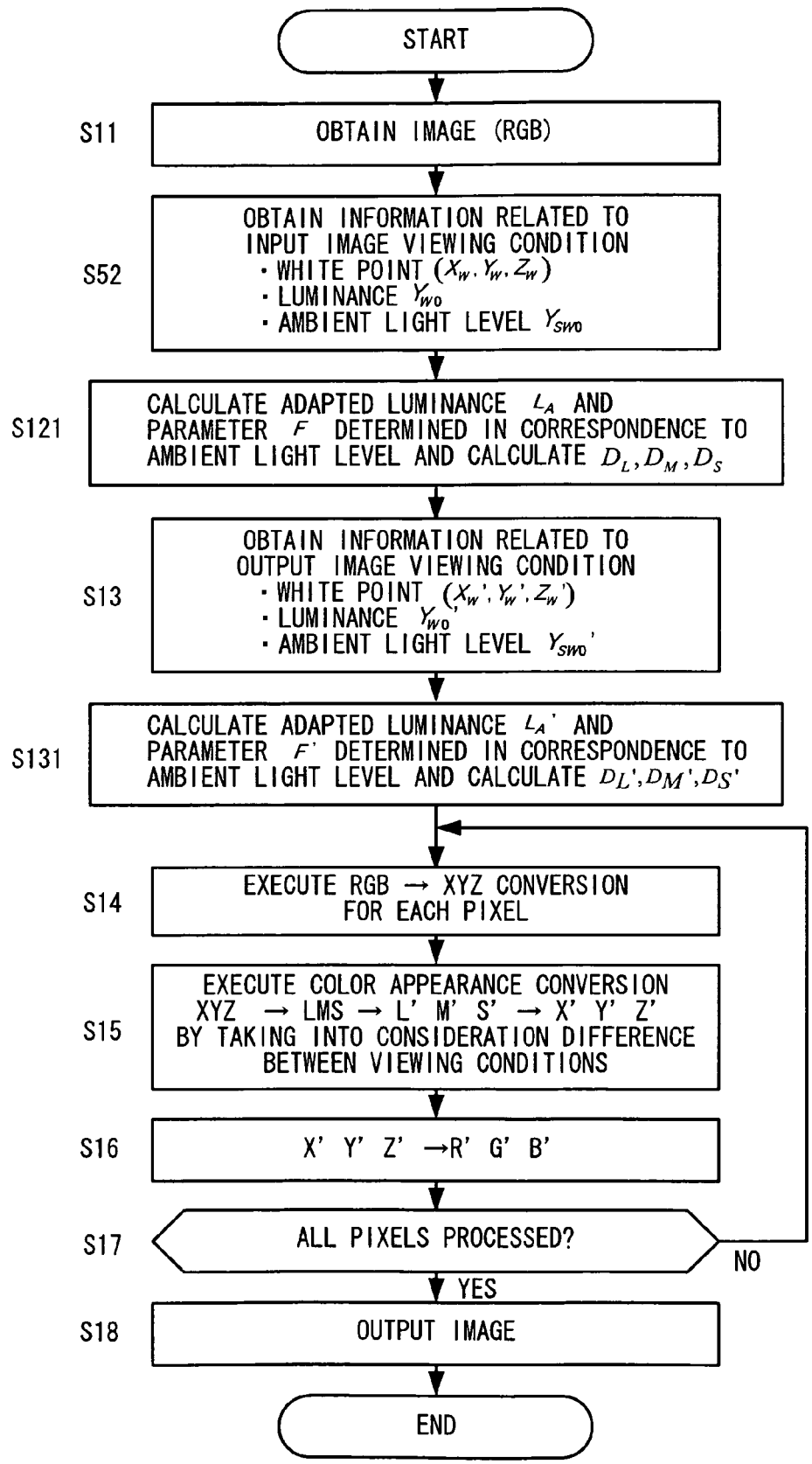

FIG. 12 presents a flowchart of the processing executed in the personal computer in the sixth embodiment. The processing in FIG. 12 is executed by the personal computer 1 in a configuration similar to that shown in FIG. 6 pertinent to the first embodiment.

The processing shown in FIG. 12 differs from the processing executed in the first embodiment, as shown in FIG. 7, only in the processing executed in step S52, which corresponds to step S12 in FIG. 7. In step S12 in the first embodiment, the information related to the photographic scene illumination is obtained. In step S52 in the sixth embodiment, information related to first viewing condition under which the image is observed (the viewing condition under which the input image is observed) is obtained. In step S13, information related to the second viewing condition under which the image is observed (the viewing condition under which the output image is observed) is obtained.

Since the processing executed in step S52 is similar to that executed in step S13, a repeated explanation is not provided. In addition, since other aspects of the processing are similar to those of the processing executed in the first embodiment, a repeated explanation is not provided.

Through the processing in the sixth embodiment described above, images reproduced to assume matching colors can be observed in a different viewing condition. Since the image data are converted by using adaptation factors optimized in correspondence to the individual visual perception physiological primary colors in the first embodiment, the color appearance can be reproduced accurately, even by using the fixed adaptation factors, regardless of the hue of the conversion target pixel.

(Other Variations)

It is to be noted that the first through sixth embodiments can be adopted in any of the various types of color conversion executed by taking into consideration the chromatic adaptation, such as a color appearance model, e.g., the CIECAM02, or the von Kries chromatic adaptation transform executed by taking into consideration only the white point conversion.

It is also to be noted that in step S13 in the first, fourth, fifth and sixth embodiments and step S33 in the third embodiment, the value $(X_W', Y_W', Z_W')$ in the CIE1931XYZ calorimetric system is calculated as the illumination white point under the output image viewing condition. However, the pixel value $(L_W', M_W', S_W')$ in the cones response space may instead be obtained as the illumination white point under the output image viewing condition.

Likewise, in step S12 in the fourth embodiment, the white point $(L_W, M_W, S_W)$ in the cones color space may be obtained as the illumination white point under the input image viewing condition instead of calculating the illumination white point $(X_W, Y_W, Z_W)$. The same principle applies to the processing executed in step S52 in the sixth embodiment.

While an explanation is given above in reference to the first embodiment on an example in which the image is brought up on display at the monitor 6, the output image may instead be displayed via a projector or as a printout. An example of data to be entered when the output image is to be provided as a printout has already been described in reference to step S13. The viewing condition under which the output image is to be observed via a projector may be entered by the user via a keyboard or the like or ascertained from the projector. The information indicating the output image viewing condition includes the white point $(X_{device}', Y_{device}', Z_{device}')$ and the luminance $Y_{device0}'$ of the projector device, and data included in the specifications or values obtained by the user through actual measurements may be entered as this information. For the ambient light white point $(X_{sw}', Y_{sw}', Z_{sw}')$ and the ambient light level $Y_{sw0}'$, $Y_{sw0}'=0$ and $(X_{sw}', Y_{sw}', Z_{sw}')=(X_{device}', Y_{device}', Z_{device}')$ may be entered if the image is to be observed in a dark room. Otherwise, the values obtained by the user by measuring the viewing condition in the viewing environment may be entered.

It is not strictly necessary to calculate the adaptation factors D both in correspondence to the condition under which the input image is obtained or the input image is observed and in correspondence to the condition under which the output image is observed. However, a higher level of accuracy in the color conversion is assured by using the two types of adaptation factors. Furthermore, by calculating adaptation factors in correspondence to the individual stimulus values, fine reproduction of color appearance is enabled, which affords the advantage of faithful image reproduction in any environment.

It is to be noted that an explanation is given in reference to the first through sixth embodiments on an example in which the expression defining the adaptation factor D set forth in the CIECAM02 as an index indicating the extent of adaptation is modified and used as the chromatic adaptation transform expression. However, the present invention may be adopted in conjunction with another defining expression, as long as it defines an index indicating the extent of adaptation by factoring in the adapted luminance. In addition, an explanation is given above by assuming that the adaptation works for the three primary colors (LMS or RGB), i.e., the parameters expressing colors, with substantially equal levels of sensitivity to a given amount of incident light. Namely, an expression reflecting the difference among the actual amounts of incident light is utilized based upon expressions assuming identical formats in correspondence to the three primary colors. However, the present invention is not limited to this example and the color conversion may be executed based upon functions or coefficients corresponding to the three primary colors that are different from one another by taking into consideration the difference among the levels of sensitivity to the three primary colors relative to a given amount of light, as long as the levels of adaptation applied in correspondence to the three primary colors are individually adjusted.

Furthermore, while an explanation is given in reference to the embodiments on an example in which a chromatic adaptation transform is executed for the physiological primary color LMS space in which the cones response of visual perception is described and the color space of the device such as a camera, the chromatic transform may be executed for other color spaces, as long as they are suited for chromatic adaptation transform.

In addition, while the physiological primary color LMS space, in which the cones response of visual perception is described, used in the embodiments is a color space adopted in the chromatic adaptation transform defined in CIECAM02 and results from conversion executed as expressed in (7) by using $M_{CAT02}$ to convert data in the CIE1931XYZ colorimetric system, another color space such as the Hunt-Pointer-Estevez cones response space or a color space resulting from a conversion executed based upon the Bradford matrix, may be utilized instead.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference: Japanese Patent Application No. 2006-315909 filed Nov. 22, 2006

The invention claimed is:

1. An image processing method for executing color conversion processing on input image data by taking into consideration chromatic adaptation so as to match a color appearance perceived under a first viewing condition and a color appearance perceived under a second viewing condition, comprising:
obtaining a plurality of first adaptation factors by performing nonlinear conversion using tristimulus values of a first illumination white point used under the first viewing condition and an adapted luminance under the first viewing condition, the plurality of first adaptation factors being set to respectively correspond to a plurality of parameters representing colors, wherein each of the plurality of first adaptation factors corresponds to one respective color, and the plurality of first adaptation factors each indicates an extent of adaptation of visual perception to the first viewing condition; and
executing the color conversion processing by using the plurality of first adaptation factors, the tristimulus values of the first illumination white point, and tristimulus values of an object under the first viewing condition.

2. An image processing method according to claim 1, wherein:
the first viewing condition is a scene illumination condition under which a scene where an input image is obtained is illuminated or a viewing condition under which the input image is observed; and
the second viewing condition is a viewing condition under which an output image is observed.

3. An image processing method according to claim 2, wherein:
the first adaptation factors are adjusted in correspondence to the scene illumination condition or the viewing condition under which the input image is observed.

4. An image processing method according to claim 2, wherein:
pixel values in the input image are analyzed and the first adaptation factors are adjusted based upon a pixel value distribution ascertained through analysis.

5. An image processing method according to claim 4, wherein:
the input image is divided into a plurality of areas and the first adaptation factors are adjusted in correspondence to each area.

6. An image processing method according to claim 1, wherein:
the parameters representing colors are made up with values assumed for three primary colors.

7. An image processing method according to claim 6, wherein:
the three primary colors are either physiological primary colors LMS determined based upon cone spectral sensitivity or sensor RGB.

8. An image processing method according to claim 6, wherein:
the first adaptation factors are adjusted based upon response values each representing a response to white in correspondence to one of the three primary colors and either a luminance level of illumination illuminating the scene where the input image is obtained or a luminance level under the viewing condition in which the input image is observed or a luminance level under the viewing condition in which the output image is observed.

9. An image processing method according to claim 1, wherein:
the first adaptation factors set in correspondence to each of the parameters representing colors assume a greater value when a greater amount of light is sensed while observing white.

10. An image processing method according to claim 9, wherein:
the amount of light is indicated as a response value representing a response to white in correspondence to each of the three primary colors.

11. A non-transitory computer-readable storage medium containing an image processing program enabling a computer to execute an image processing method according to claim 1.

12. An image processing device comprising:
a control unit that executes an image processing method according to claim 1.

13. A camera, comprising:
an imaging unit that captures a subject image;
a display unit; and
a control unit, wherein:
the control unit executes color conversion processing on image data generated by capturing an image via the imaging unit through an image processing method according to claim 1 and displays image data resulting from the color conversion processing at the display unit.

14. A camera according to claim 13, further comprising:
a photometering unit, wherein:
the control unit sets the viewing condition under which the output image is observed based upon photometering data obtained via the photometering unit and an illumination condition under which the image display unit is illuminated.

15. An image processing method according to claim 1, wherein:
the second viewing condition is a scene illumination condition under which a scene where an input image is obtained is illuminated or a viewing condition under which the input image is observed; and
the first viewing condition is a viewing condition under which an output image is observed.

16. An image processing method according to claim 15, wherein:
the first adaptation factors are adjusted in correspondence to the viewing condition under which the output image is observed.

17. An image processing method according to claim 1, further comprising:
obtaining a plurality of second adaptation factors by performing nonlinear conversion using tristimulus values of a second illumination white point used under the second viewing condition and an adapted luminance under the second viewing condition, the plurality of second adaptation factors being set to respectively correspond to the plurality of parameters representing colors, the plurality of second adaptation factors each indicating an extent of adaptation of visual perception to the second viewing condition; and
executing the color conversion processing by using the plurality of first adaptation factors and the plurality of second adaptation factors, the tristimulus values of the second illumination white point, and tristimulus values of the object under the second viewing condition.

18. An image processing method for executing color conversion processing on input image data by taking into consideration chromatic adaptation so as to match a color appearance perceived under a first viewing condition and a color appearance perceived under a second viewing condition, comprising:
obtaining a plurality of first adaptation factors by performing nonlinear conversion using tristimulus values of a first illumination white point used under the first viewing condition and an adapted luminance under the first viewing condition, the plurality of first adaptation factors to respectively correspond to three primary colors, wherein each of the plurality of first adaptation factors corresponds to one respective primary color, and the plurality of first adaptation factors each indicates an extent of adaptation of visual perception to the first viewing condition; and
executing the color conversion processing by using the plurality of first adaptation factors, the tristimulus values of the first illumination white point, and tristimulus values of an object under the first viewing condition.

19. An image processing method to claim 18, wherein:
the three primary colors are physiological primary colors LMS determined based upon cone spectral sensitivity.

* * * * *